United States Patent Office 3,038,785
Patented June 12, 1962

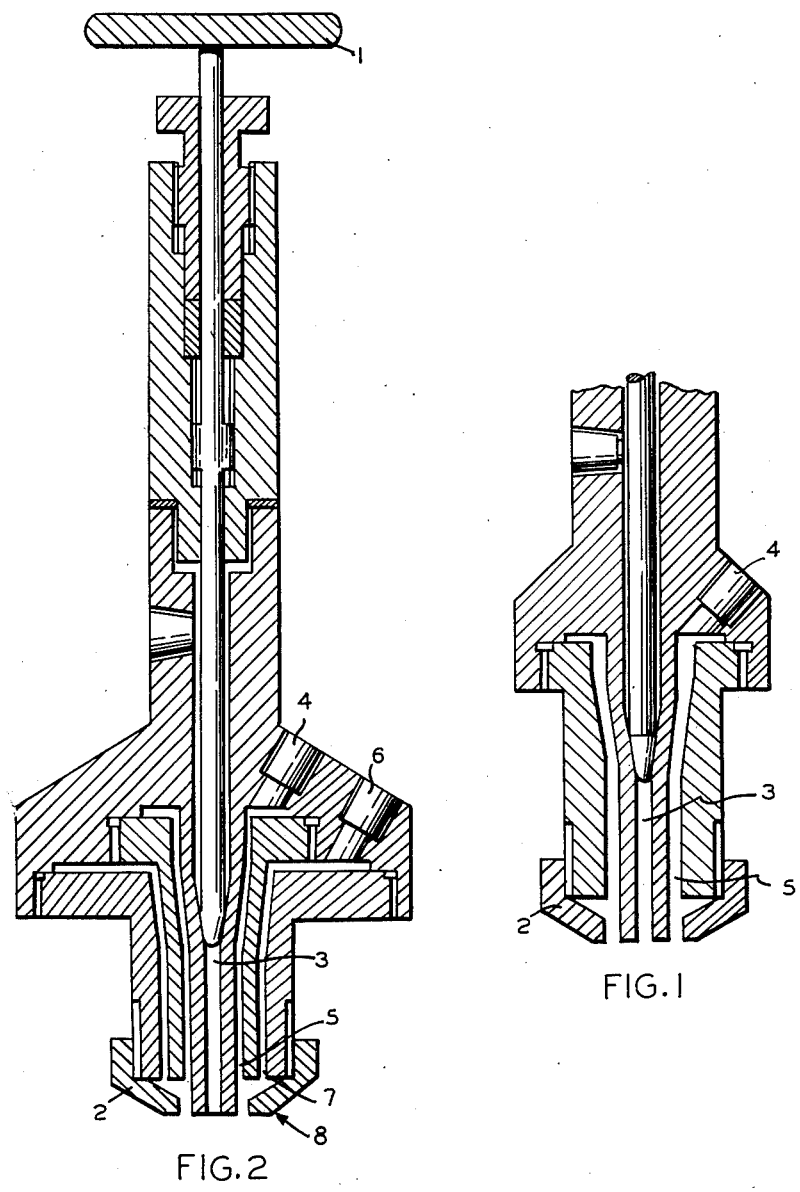

3,038,785
MANUFACTURE OF CHLORAMINE
George L. Braude, North Linthicum, and Joseph A. Cogliano, Baltimore, Md., assignors to W. R. Grace & Co., New York, N.Y., a corporation of Connecticut
Filed Jan. 11, 1961, Ser. No. 82,062
3 Claims. (Cl. 23—190)

This invention relates to a novel process for the manufacture of chloramine. More specifically, this invention is a new and improved technique for the direct reaction of anhydrous ammonia and chlorine whereby high yields of chloramine are effectively provided and the use of aqueous solution is avoided.

Chloramine, $NH_2Cl$, has long been known as a useful chemical product for use as a germacide component, or for subsequent use in the manufacture of hydrazine, $NH_2NH_2$. Generally, chloramine is produced by the reaction of an aqueous metal hypochlorite solution with aqueous ammonia, as in the Raschig synthesis. However, aqueous processes generally are subject to the disadvantage that the ultimate product is provided as a very dilute aqueous solution and presents an expensive recovery operation.

A second method for the production of chloramine is that described by Sisler and Mattair in U.S. 2,710,248: In this process, gaseous chlorine, admixed with nitrogen, is reacted with a large excess of gaseous ammonia to produce a mixture of chloramine, ammonium chloride, nitrogen and ammonia. Another method for preparing chloramine has been described in U.S. 2,678,258: solutions of anhydrous ammonia and chlorine in carbon tetrachloride or other halogenated solvents are mixed carefully. A mixture of ammonia chloride and of chloramine is obtained as a solution in the solvent selected.

On the laboratory scale, all of these methods are more or less satisfactory, and yield a maximum of 70–80% of the calculated amount of chloramine. Serious difficulties are, however, experienced when an attempt is made to scale up any of these processes. In mixing a stream of chlorine and ammonia, with or without nitrogen, an exothermic reaction results. The heat generated cannot be removed by cooling in a heat exchanger on a large scale due to the deposition of ammonium chloride on all surfaces. The results are: low or erratic yields, flame formation (or explosions) and fouling of heat exchangers, lines and valves by depositing ammonium chloride.

The problem of removing the excessive heat of reaction has been realized before. A process has been described wherein the heat of reaction is removed by recirculating ammonium chloride in large excess (100–2,000 parts of $NH_4Cl$ per 1 part of $Cl_2$). The ammonium chloride particles are used in this method as a heat exchange medium in a fluidized bed to obtain better temperature control.

Aside from the problem of recirculating such large quantities of ammonium chloride, this process suffers from the disadvantage that ammonium chloride, particularly in solid form, is a catalyst for the decomposition of chloramine and the yields of chloramine are low.

It is an object of this invention to provide a process for the manufacture of chloramine from chlorine and ammonia on a large scale and in good yields. It is a further object of this invention to eliminate the inherent hazard of the formation of flames or explosions in the reaction of gaseous chlorine with ammonia without adequate heat removal. It is a further object of this invention to obviate the need for diluent nitrogen, or recirculating ammonium chloride or the use of solvents in the system. And finally, it is the object of this invention to obtain a fluffy, easily filterable ammonium chloride in the gas phase, which is not caked by the heat of reaction, and which does not adhere to surfaces of reactors, pipes, and valves.

In the present process, chloramine is obtained as a gas stream admixed with a large excess of ammonia. It can be used for a variety of reactions, such as the manufacture of hydrazinium compounds, hydrazines, and many other products.

Novel Features and Summary of Invention

The process of this invention consists in combining a stream of gaseous chlorine with a finely dispersed or atomized liquid ammonia stream with or without additional gaseous ammonia. These streams are introduced into a pipe or reactor, and good yields of chloramine are obtained. The feature of this invention is, that only a limited amount of finely dispersed liquid ammonia is used. The quantity used is calculated from the heat of the reaction of chlorine with ammonia, and the latent heat of evaporation of liquid ammonia. These two values should essentially balance to maintain adiabatic temperature conditions.

Liquid ammonia was used in the past to prepare hydrazine via chloramine, as described in a publication by Mattair and Sisler (JACS 73, 1619, 1951) and in U.S. 2,726,935. In no instance, however, was it possible to isolate chloramine from the liquid ammonia. Chloramine solutions in liquid ammonia cannot be maintained at above approximately $-35°$ C. without spontaneously forming hydrazine or ammonium chloride.

An essential feature of the process of this invention is the use of liquid ammonia in such a way that it controls the heat of the reaction without forming pools or larger droplets in the reaction zone. In addition, we provide means for producing a fine mist of fog of liquid ammonia. Droplets of liquid ammonia, when subjected to the heat of reaction with chlorine, evaporate rapidly. There is no localized excess of liquid ammonia present which would favor the formation of hydrazine and ammonium chloride.

Process Description

Normally, high temperatures are reached in the reaction between gaseous chlorine and gaseous ammonia. Experiments were made in which a stream of gaseous chlorine was introduced into a stream of gaseous ammonia, in accordance with the methods described by Sisler et al. Thermocouples were placed at different locations in front of the emerging chlorine stream and measurements were carried out. The following results were obtained: approaching the center of the chlorine stream cone, and at a distance of a few inches from the nozzle (depending upon flow velocity) a maximum area of high temperature was observed. If the flow used was large enough, temperatures in the cone increased rapidly on starting the chlorine introduction to 220–240° C. in the hottest area. At this temperature, self ignition occurred, and the chlorine burned in the ammonia atmosphere. This temperature can be considered the self-ignition temperature for chlorine and ammonia in this system.

Measurement of the yield of chloramine obtained in these experiments indicate, that overall yields decrease with increasing temperature, and fall to practically zero above 220–240° C., and ignition.

To better understand the reason for this rapid increase in temperature, a thermodynamic calculation was carried out on the two main reactions known to occur between chlorine and ammonia.

The first is the reaction of chlorine and ammonia to form chloramine. The second, a side reaction which results in the lowering of the yield of chloramine, occurs under unfavorable conditions (such as high temperatures, presence of liquid pools of ammonia, etc.).

(1) $Cl_2 + 2NH_3 \rightarrow NH_2Cl + NH_4Cl$,
$\Delta H\ 25°\ C. = -60.25$ Kcal.

(2) $3Cl_2 + 8NH_3 \rightarrow N_2 + 6NH_4Cl$,
$\Delta H\ 25°\ C. = -363$ Kcal.

Assuming an 80% yield of chloramine, based on chlorine, the total heat of reaction per mole of chlorine consumed is: −72.5 kilocalories. This large value shows that the reaction is very exothermic and explains the high temperatures observed.

To compensate for this heat of reaction, and maintain room temperature conditions in the reaction zone, 15.3 moles of liquid $NH_3$ must be evaporated to gaseous $NH_3$ per mole of chlorine. In other words, the latent heat of evaporation supplied by the ammonia is used to neutralize the heat of reaction of the process. Expressed in weights, 3.69 parts of liquid ammonia are needed theoretically per part of gaseous chlorine.

It should be noted, however, that the aforementioned quantities are functions of the desired operating temperature, and in the case just mentioned, this is room temperature. If the temperature of the reaction mixture is allowed to rise to 100° or 150° C., and it can safely rise to that extent without undue loss, obviously less liquid ammonia would be required. As well, if the liquid ammonia is added at a temperature below that of room temperature or the desired working temperature, less ammonia would be needed. In these cases, it is only necessary to bear in mind the necessary excess of ammonia.

To carry out the process of this invention, specially designed nozzles are used, as shown in FIGURES I and II. Successful results were obtained with a nozzle having a chlorine opening of approximately 1/16 square inch in cross section area. The ammonia opening was even smaller. In practice, the size of the ammonia opening is not critical. The ammonia feed, being in liquid form, would be controlled rather by the pressure behind it. Obviously the smaller the ammonia opening, the higher the pressure required to force sufficient ammonia through the opening to fulfill the reaction requirements as previously stated. Liquid chlorine is vaporized in a heat exchanger and metered into the adjustable center jet of the nozzle shown in FIGURE I at the rate of 10 lbs./hr. Simultaneously, liquid ammonia from a pressure tank is introduced into the nozzle and flows out through the external annular spacing surrounding the chlorine, at the rate of 35 lbs./hr. It is necessary to pressurize the liquid ammonia storage with nitrogen to at least 200 and preferably above 1,000 lbs. This helps in obtaining a finer spray and smaller particles of liquid ammonia.

A stream of chloramine is obtained containing excess gaseous ammonia obtained by vaporization, nitrogen as a by-product and suspended ammonium chloride. If desired the fine particle size ammonium chloride can be removed in a filter arrangement to obtain a gas stream essentially free of solids.

An alternate nozzle design is shown in FIGURE II. Herein vaporized chlorine at the rate of 10 lbs./hr. is introduced through the center opening of the nozzle. Liquid ammonia, at the rate of 30 lbs./hr., is pressurized into the next annular space of the three-way nozzle. Again, the size of the openings would depend upon the relative amount of material flowing through. Dispersion of the liquid ammonia is improved by using 70 lbs./hr. of gaseous ammonia in the external annular space of the nozzle. Premixing of gaseous and liquid ammonia occurs in this system, which helps obtain a finer divided mist of ammonia droplets. Here again, the final product is a mixture of chloramine, excess ammonia, nitrogen and solid ammonium chloride in finely divided, non-agglomerated form.

The nozzles described above may be more fully understood by referring to FIGURES I and II, the former used with chlorine and liquid ammonia and the latter with chlorine and both gaseous and liquid ammonia.

Chlorine gas is introduced via needle valve 1 under pressure, to be emitted as a fine spray through the chlorine outlet of the nozzle 3. Liquid ammonia is simultaneously introduced into the nozzle at 4 and expelled as a fine mist at 5. Where gaseous ammonia is also used (FIGURE I) it is introduced at 6, emitted at 7. The entire stream is regulated by a removable deflector plate 2. It is to be noted that at 8 the ratio of areas of gaseous ammonia to liquid ammonia to chlorine are 7 to 0.035 to 1, thus allowing for maximum contact between the two gases while the liquid exerts its cooling effect.

The foregoing discussion is given as an illustration of a working model of our invention. Needless to say, obvious modifications upon these nozzles could be made which would have no effect upon the essence of our invention.

We claim:

1. The process of manufacture of an anhydrous chloramine gaseous product comprising mixing at temperatures below 220° C. chlorine gas and a quantity of liquid ammonia whose heat of vaporization bears such a relationship to the heat of reaction of said liquid ammonia and said chlorine that the overall temperature of the reaction is held at a predetermined temperature, below which chloramine appreciably decomposes, and below 220° C. by simultaneously introducing said components into a device which renders said components into a fine spray and simultaneously ejects said components causing said components to be comixed upon leaving said device thereby reacting to form chloramine in a heat-controlled atmosphere.

2. The process as described in claim 1 wherein gaseous ammonia sufficient to supply a total ammonia concentration to control the formation of undesirable by-products is added.

3. The process of manufacture of an anhydrous chloramine gaseous product comprising vaporizing liquid chlorine in a heat exchanger, metering said chlorine into one channel of a nozzle at a convenient rate, simultaneously adding liquid ammonia from a pressure tank, into a second channel of said nozzle through an external annular spacing surrounding the chlorine exit channel in a quantity whose heat of vaporization bears such a relationship to the heat of reaction of said liquid ammonia with said chlorine that the overall temperature of the reaction is held at room temperature, said liquid ammonia being pressurized with nitrogen to at least 200 and preferably above 1,000 lbs., and allowing the aforementioned reactants to flow from said nozzle in such a manner as to obtain a stream of chloramine containing excess gaseous ammonia, nitrogen, and suspended ammonium chloride.

References Cited in the file of this patent

UNITED STATES PATENTS

| | | |
|---|---|---|
| 2,747,974 | Felger | May 29, 1956 |
| 2,837,409 | Sisler et al. | June 3, 1958 |